(12) United States Patent  (10) Patent No.: US 8,939,461 B1
Kalmanson  (45) Date of Patent: Jan. 27, 2015

(54) TOW HEAD APPARATUS FOR USE WITH DIFFERENT SIZED AIRCRAFT TOW PINS

(71) Applicant: Julius John Kalmanson, Tucson, AZ (US)

(72) Inventor: Julius John Kalmanson, Tucson, AZ (US)

( * ) Notice: Subject to any disclaimer, the term of this patent is extended or adjusted under 35 U.S.C. 154(b) by 19 days.

(21) Appl. No.: 14/034,450

(22) Filed: Sep. 23, 2013

(51) Int. Cl.
*B60D 1/04* (2006.01)
*B64F 1/22* (2006.01)
*B60D 1/48* (2006.01)

(52) U.S. Cl.
CPC ... *B60D 1/04* (2013.01); *B64F 1/22* (2013.01); *B64F 1/224* (2013.01); *B60D 1/486* (2013.01)
USPC ....................................................... 280/503

(58) Field of Classification Search
CPC ............................... B64F 1/224; B60D 1/486
USPC .................................................. 280/503, 514
See application file for complete search history.

(56) References Cited

U.S. PATENT DOCUMENTS

| | | | | |
|---|---|---|---|---|
| 3,955,832 | A | * | 5/1976 | Kalmanson ................. 280/476.1 |
| 4,418,936 | A | * | 12/1983 | Adams et al. ................. 280/493 |
| 4,426,098 | A | * | 1/1984 | Kalmanson .................... 280/504 |
| 5,078,418 | A | | 1/1992 | Kalmanson |
| 5,129,667 | A | * | 7/1992 | Gratton .......................... 280/493 |
| 5,967,541 | A | * | 10/1999 | Johansen ....................... 280/504 |
| 6,543,790 | B2 | * | 4/2003 | Johnson ............................ 280/3 |

* cited by examiner

*Primary Examiner* — Kevin Hurley
(74) *Attorney, Agent, or Firm* — Plager Schack LLP

(57) ABSTRACT

An aircraft tow head apparatus for use with aircraft tow pins of different diameters has a pair of side plates each having a first side plate and a second side plate both having a longitudinal axis and having a wall thickness sufficiently large to accommodate a plurality of apertures extending through the wall perpendicularly to the longitudinal axis to permit the first and second plate to be mechanically fastened together in one of a plurality of relative positions, where in a first position, the space defined by the first and second plates for the tow pin has a first general nominal diameter and where in a second position, the space defined by the first and second plates for the tow pin has a second general nominal diameter, whereby a user may reposition the first plate relative to the second plate as needed to accommodate tow pins of differing diameters.

3 Claims, 6 Drawing Sheets

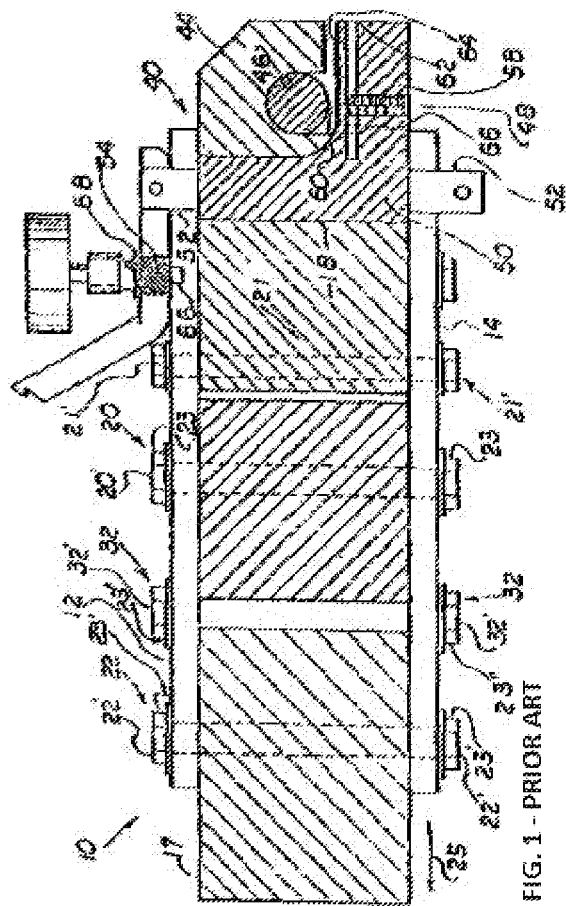
FIG. 1 - PRIOR ART

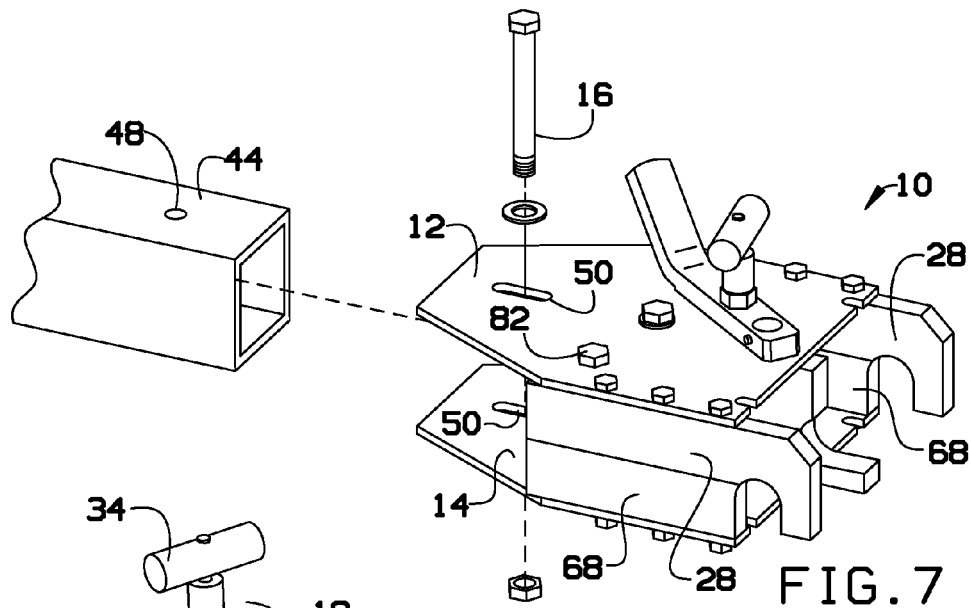
FIG. 7
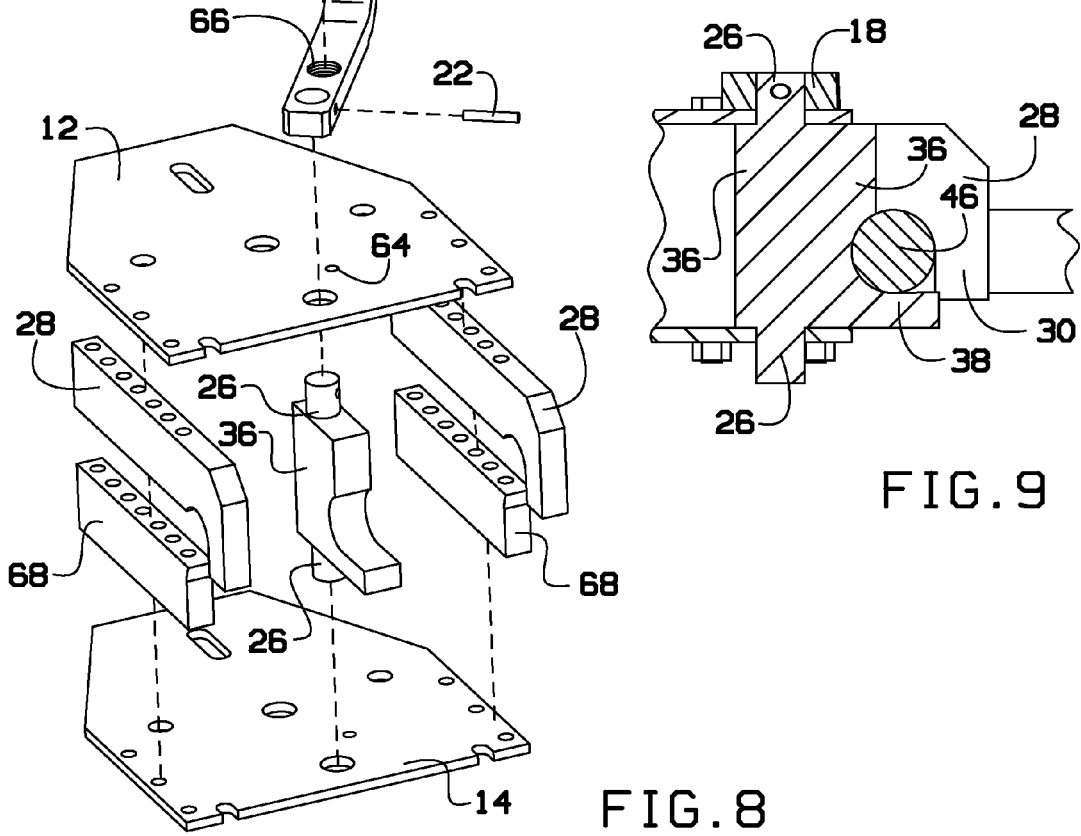
FIG. 9
FIG. 8

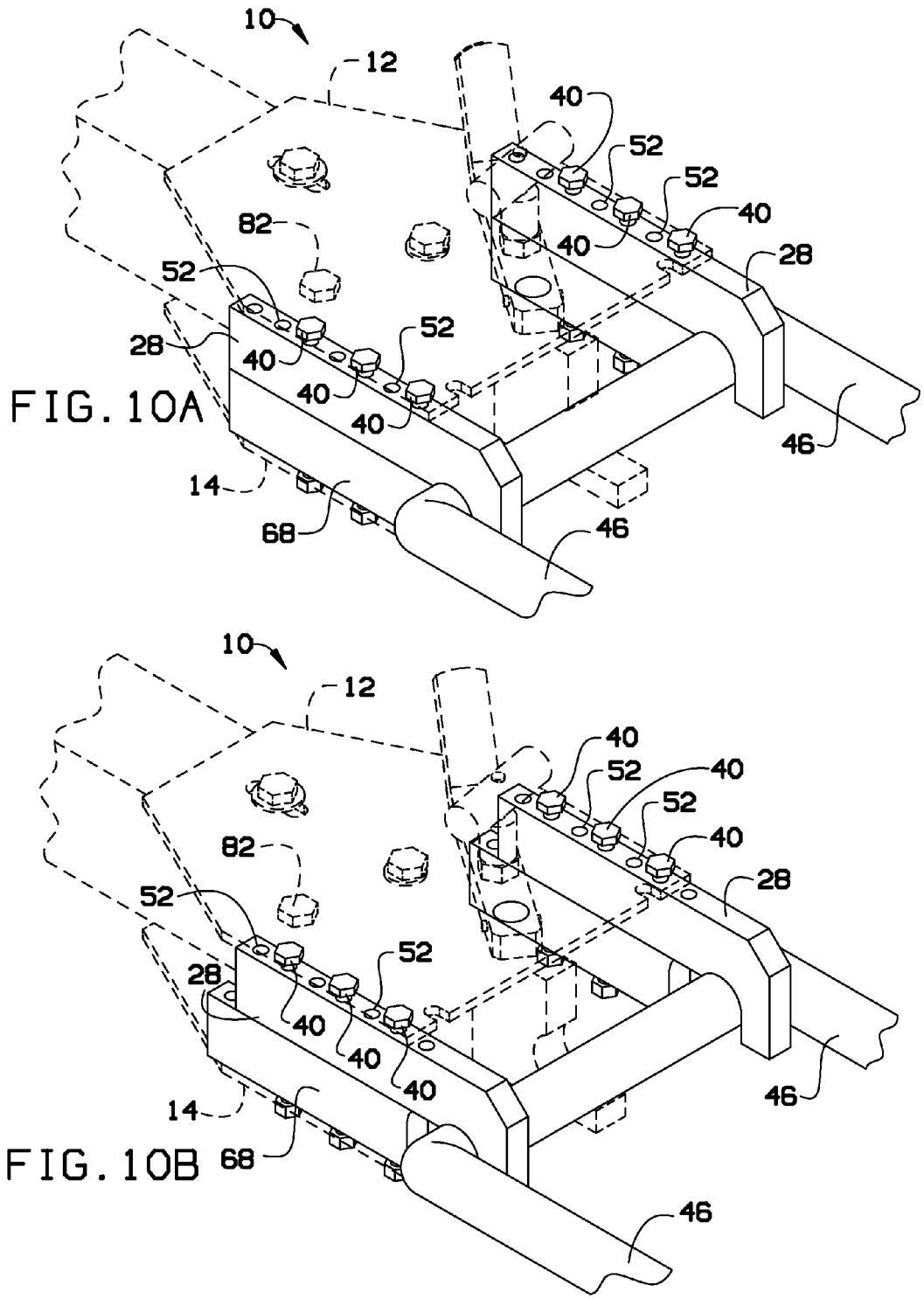

TOW HEAD APPARATUS FOR USE WITH DIFFERENT SIZED AIRCRAFT TOW PINS

BACKGROUND

The embodiments herein relate generally to an aircraft tow head apparatus.

A tow head assembly is mounted on the tow bar of a towing vehicle and configured to engage with the tow pin of an aircraft located near the landing gear. This allows the towing vehicle to engage with the aircraft landing gear for movement and travel of the aircraft to the intended position. A tow head assembly for use with aircraft tow pins is disclosed in U.S. Pat. No. 5,078,418, which is a tow head assembly comprising side plates and an adjustable cam to engage and lock the aircraft tow pin between the side plates and the cam. However, this tow head assembly is limited because the side plates are not adjustable to accommodate aircraft tow pins having different sized diameters. Tow pin diameters vary depending on the type of aircraft. As such, it is inefficient for the towing vehicle operator to replace the tow head assembly on a tow bar in order to accommodate a new aircraft with a different sized tow pin.

As such, there is a need in the industry for a tow head apparatus that can be easily adjusted to engage and lock aircraft tow pins with different sized diameters.

SUMMARY

An aircraft tow head apparatus for use with aircraft tow pins of different diameters by incorporating multiple side plates that define a tow pin opening sufficiently large to permit adjustment to accommodate the tow pins of different diameters, the tow head apparatus further comprising a locking device to lock the aircraft tow pin into position is provided. The tow head apparatus comprises a pair of side plates each comprising a first side plate and a second side plate that are configured so that when joined together define a space through which a tow pin may be locked into place, the first and second side plates of each pair of side plates having a longitudinal axis and comprising a wall having a thickness sufficiently large to accommodate a plurality of apertures extending through the wall perpendicularly to the longitudinal axis to permit the first and second plate to be mechanically fastened together in one of a plurality of relative positions, where in a first position, the space defined by the first and second plates for the tow pin has a first general nominal diameter and where in a second position, the space defined by the first and second plates for the tow pin has a second general nominal diameter, whereby a user may reposition the first plate relative to the second plate as needed to accommodate tow pins of differing diameters.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a sectional view of a tow head apparatus in the prior art;

FIG. 7 depicts an exploded view of one embodiment of the tow head apparatus demonstrating a hitch attachment;

FIG. 8 depicts an exploded view of one embodiment of the tow head apparatus;

FIG. 9 depicts a sectional view of one embodiment of the tow head apparatus along line 9 in FIG. 5B.

FIG. 10A depicts a perspective view of one embodiment of the tow head apparatus where upper side plates 28 are in a first position; and FIG. 10B depicts a perspective view of one embodiment of the tow head apparatus where upper side plates 28 are in a second position.

DETAILED DESCRIPTION OF CERTAIN EMBODIMENTS

FIG. 1 depicts a tow head assembly in the prior art as described above.

Figure 2A:
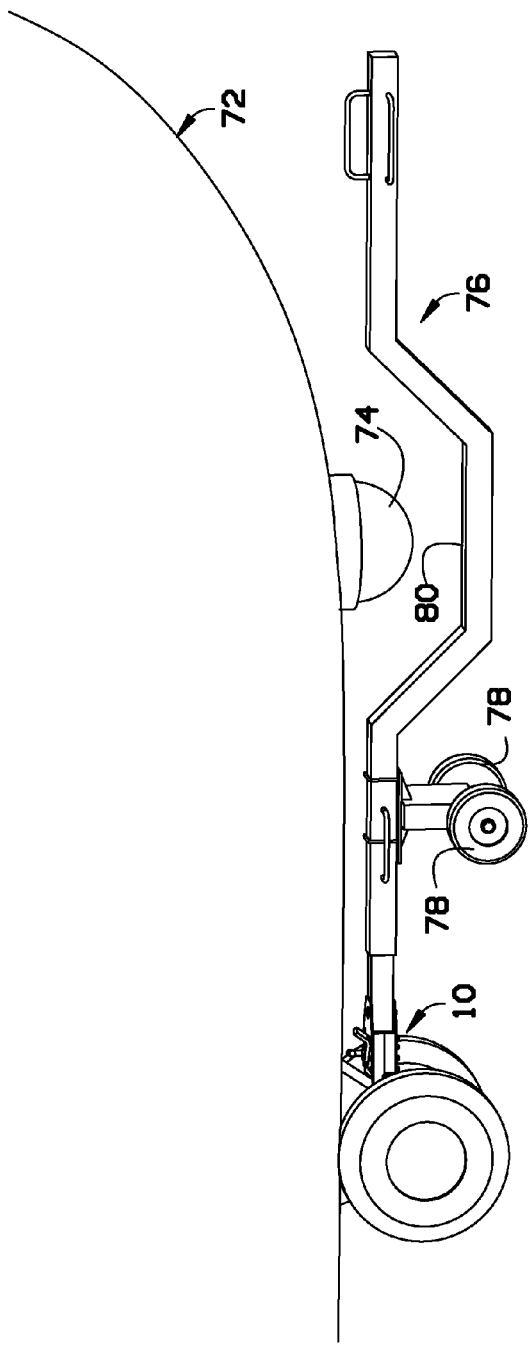
FIG. 2A depicts a perspective view of certain embodiments of the invention in use.
Figure 2B:
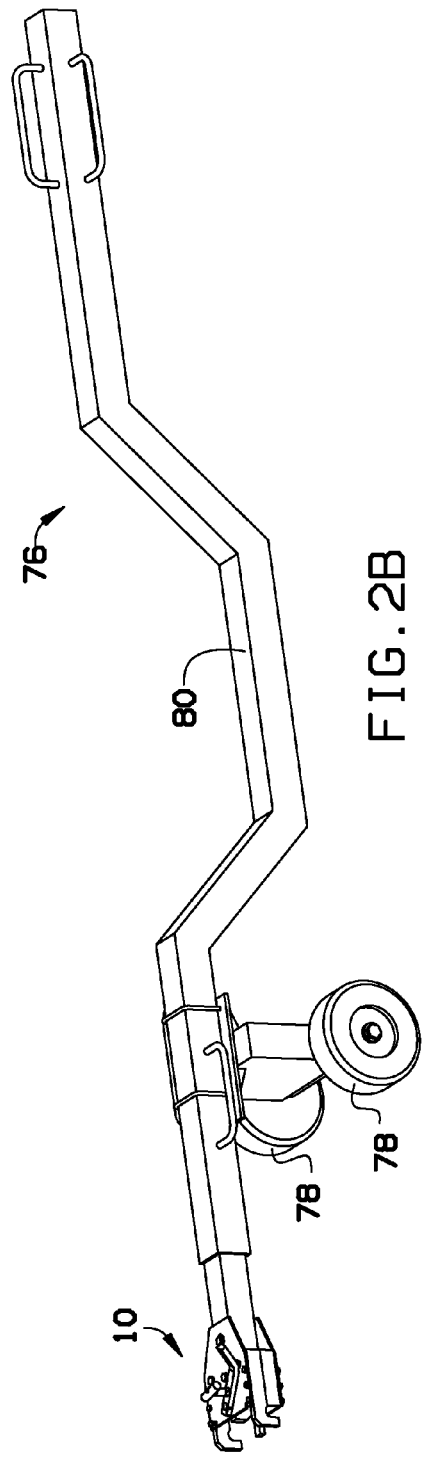
FIG. 2B depicts a perspective view of certain embodiments of the invention in use.

FIGS. 2A and 2B depict tow head apparatus 10 in use with tow bar 76, tow bar wheels 78 and aircraft 72. Tow bar 76 has tow bar indentation 80 to accommodate an aircraft device 74 such as a FLIR BALL comprising an infrared camera with electronics inside of the ball. It shall be appreciated that tow bar 76 is a modified tow bar having plates on all four sides of each bend. This strengthens the tow bar during operation of a push, pull or turn of the aircraft.

Figure 3:
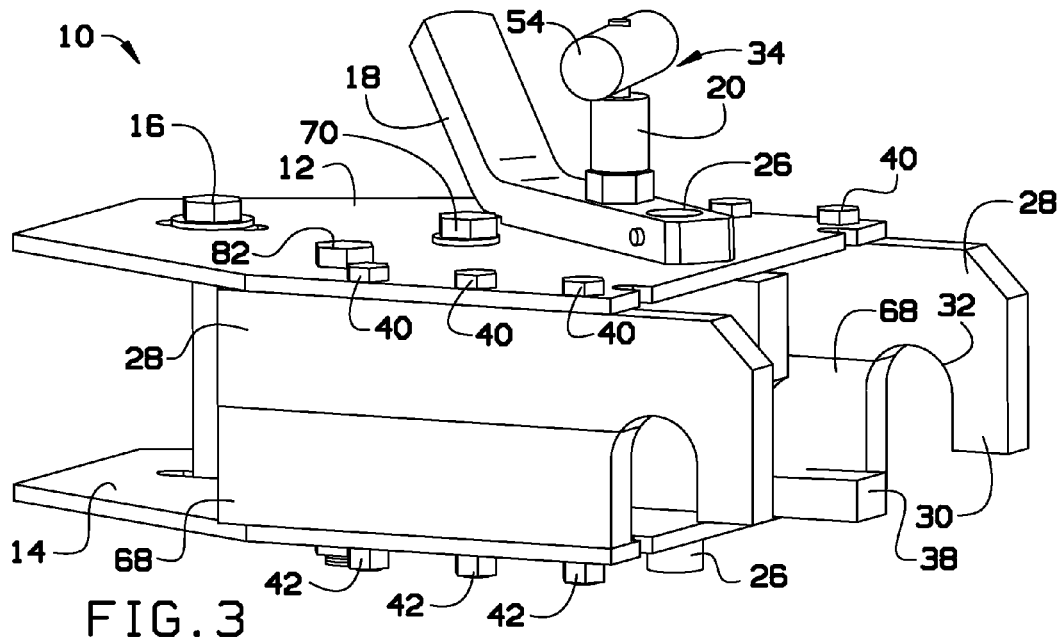
FIG. 3 depicts a perspective view of one embodiment of the tow head apparatus.
Figure 4:
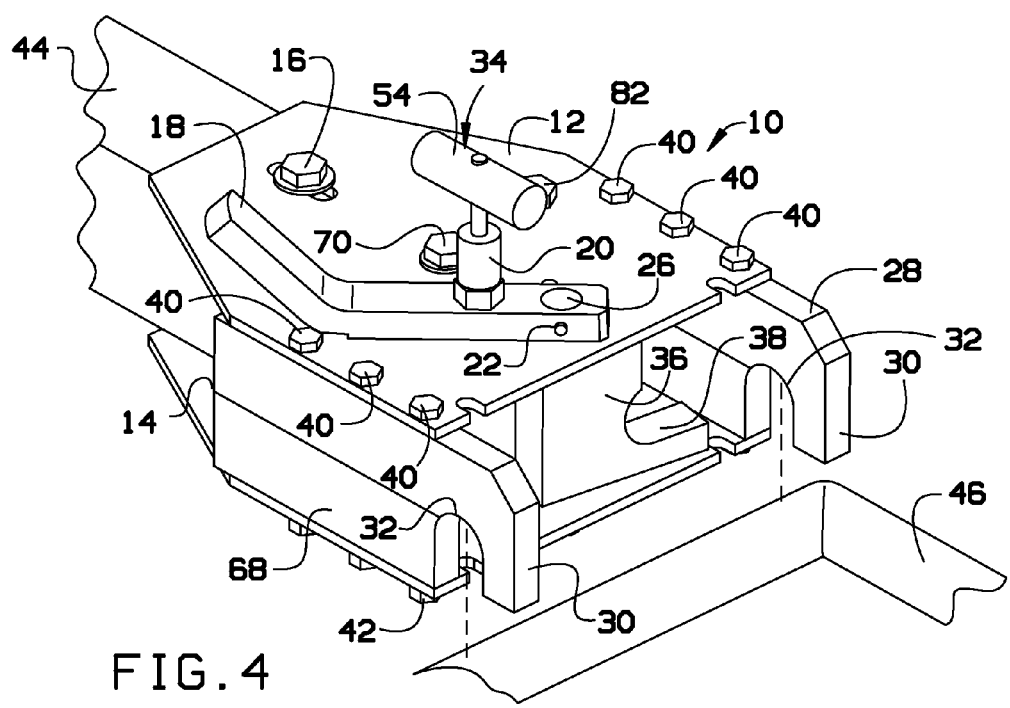
FIG. 4 depicts a perspective view of one embodiment of the tow head apparatus in a pre-engaged configuration.

FIGS. 3-4 depict certain embodiments of tow head apparatus 10. Tow head apparatus 10 comprises upper plate 12, lower plate 14, upper side plates 28 and lower side plates 68. Upper side plates 28 comprise hooks 30 and notches 32 configured to accommodate aircraft tow pin 46. Upper plate 12, lower plate 14, upper side plates 28 and lower side plates 68 are secured by bolts 40, nuts 42, shear bolt 70, safety bolt 16 and anti jack knife bolts/pins 82. Tow head apparatus 10 is secured to hitch bar 44 by safety bolt 16. The tow head apparatus is designed such that if shear bolt 70 shears from an overload during a push or pull of an aircraft, safety bolt 16 will support the load and keep the aircraft secured to the tow head apparatus. Anti jack knife bolts/pins 82 help to support the load and keeps the aircraft directly behind a towing vehicle. Referring to FIG. 2A, it shall be appreciated that if shear bolt 70 shears, safety bolt 16 of tow head apparatus 10 and the strength of tow bar 76 will keep aircraft device 74 in the center of tow bar indentation 80 when aircraft 72 is being towed. This prevents aircraft device 74, such as a FLIR BALL and its interior camera and electronics, from being damaged.

Tow head apparatus 10 further comprises an adjustable locking device 34, which comprises a rotatable handle bar 18, handle body 20, lock device handle 54, cam 36, cam shaft 26, cam shaft pin 22 and cam extension tongue 38.

Figure 5A:
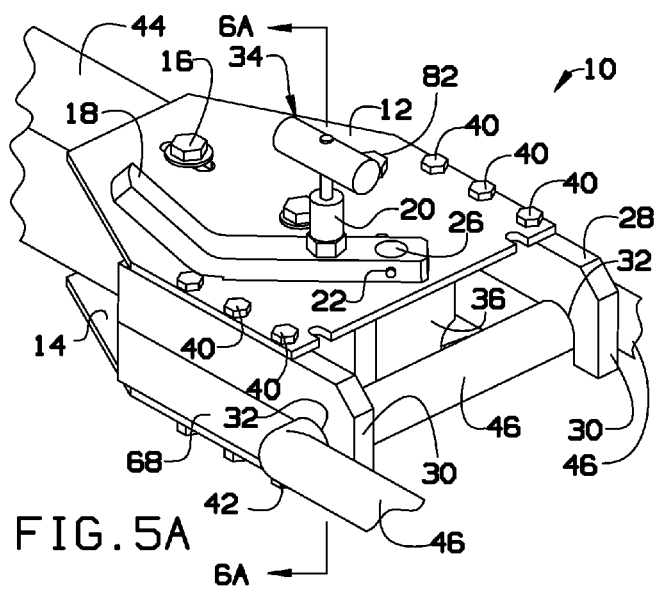
FIG. 5A depicts a perspective view of one embodiment of the tow head apparatus with a tow pin engaged but not locked.

FIG. 5A depicts tow head apparatus 10 engaged with aircraft tow pin 46, but in an unlocked position. In this configuration, tow pin 46 is placed within hooks 30 and notches 32 of upper side plates 28, but locking device 34 is in an unlocked position with cam 36 situated within upper plate 12 and lower plate 14, and away from tow pin 46.

Figure 5B:
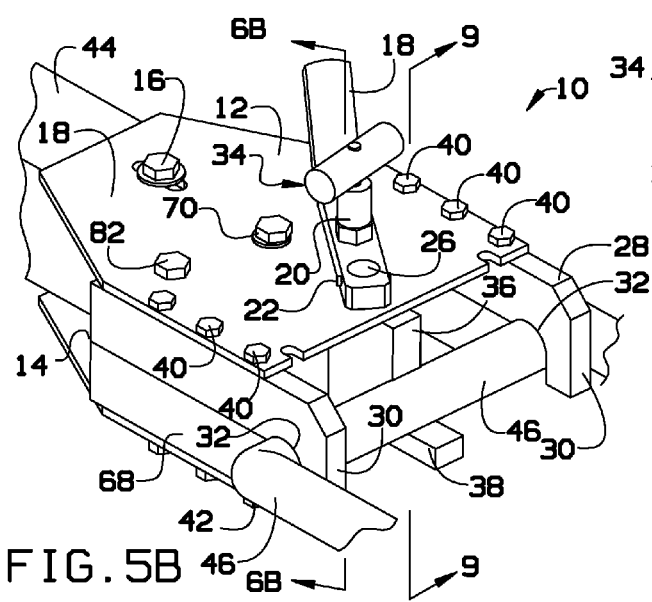
FIG. 5B depicts a perspective view of one embodiment of the tow head apparatus with a tow pin engaged and locked.

FIG. 5B depicts tow head apparatus 10 engaged with aircraft tow pin 46 and in a locked position. In this configuration, aircraft tow pin 46 is secured within hooks 30 and notches 32 of upper side plates 28 and cam extension tongue 38 of cam 36. In this locked position, an aircraft is engaged and locked with tow head apparatus 10 and ready to be towed to a desired location.

Figure 6A:
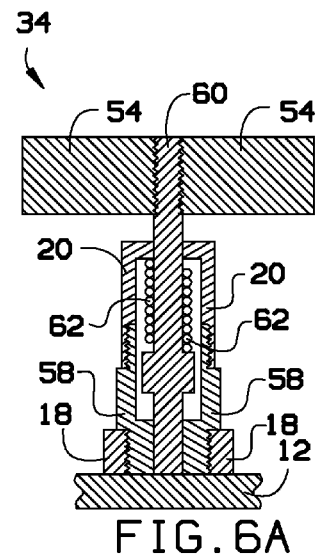
FIG. 6A depicts a sectional view of one embodiment of locking device 34 taken along line 6A in FIG. 5A.
Figure 6B:
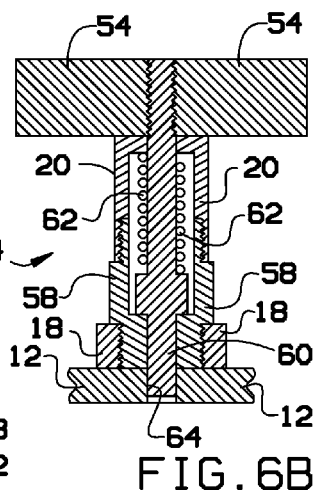
FIG. 6B depicts a sectional view of one embodiment of locking device 34 taken along line 6B in FIG. 5B.

It shall be appreciated that a user may lock or unlock aircraft tow pin 46 by adjusting locking device 34. FIG. 6A depicts a sectional view of locking device 34 in an unlocked position as shown in FIG. 5A. Locking device 34 comprises lock pin 60, lock device handle 54, handle body 20, lock device spring 62, double male threaded nut end-cap 58 and rotatable handle bar 18. One end of double male threaded nut end-cap 58 is inserted into threaded aperture 66 of handle bar 18 as shown in FIG. 8. The lock device spring 62 allows lock pin 60 to expand and compress to allow the user to adjust locking device 34 with ease. To adjust locking device 34 from the unlocked position to the locked position, the user pulls upward on lock device handle 54. This compresses spring 62 and pulls lock pin 60 upward, which allows the user to rotate locking device 34 clockwise by using rotatable handle bar 18. This rotation causes cam 36 to rotate such that cam extension tongue 38 is secured beneath aircraft tow pin 46 as shown in FIG. 5B. The user will release lock device handle 54, which causes spring 62 to expand and allow lock pin 60 to be secured within aperture 64 of upper plate 12 as shown in FIG. 6B. In this configuration, locking device 34 is in the locked position. FIG. 9 depicts a sectional view of tow head apparatus 10 in a locked position where tow pin 46 is locked and engaged. It shall be appreciated that the user may easily unlock locking device 34 by pulling upward on lock device handle 54 and rotating handle bar 18 counter-clockwise. This motion rotates cam 36 and cam extension tongue 38 away from aircraft tow pin 46.

FIGS. 7 and 8 depict exploded views of certain embodiments of tow head apparatus 10. As shown in FIG. 7, tow head apparatus 10 is secured to hitch bar 44 by securing safety bolt 16 through hitch bar aperture 48 and slots 50 on upper plate 12 and lower plate 14. It should be understood that any type of washer and nut may be used with safety bolt 16. As shown in FIG. 8, upper side plates 28 and lower side plates 68 comprise a plurality of apertures. This allows upper side plates 28 and lower side plates 68 to be adjusted and repositioned relative to one another such that the space defined by hooks 30 and notches 32 of upper side plates 28 may be made larger or smaller in order to accommodate aircraft tow pins having different sized diameters.

FIGS. 10A and 10B depict certain embodiments of the invention where upper side plates 28 and lower side plates 68 are mechanically fastened in two different positions, thereby allowing tow head apparatus 10 to accommodate different sized diameter tow pins. As shown in the figures, upper side plates 28 and lower side plates 68 comprise a plurality of apertures 52. It shall be appreciated that the side plates may comprise any number of apertures. This allows upper side plates 28 and lower side plates 68 to be mechanically fastened by bolts 40 and nuts 42 through apertures 52 in one of a plurality of relative positions to accommodate an aircraft tow pin 46 having a particular sized diameter. As shown in FIG. 10A, upper side plates 28 and lower side plates 68 are fastened in a first position to accommodate tow pin 46 having a particular diameter. As shown in FIG. 10B, upper side plates 28 and lower side plates 68 are fastened in a second position to accommodate an aircraft tow pin 46 having a larger diameter. It shall be appreciated that cam 36 of locking device 34 may be replaced with a different shaped cam in order to better accommodate an aircraft tow pin having a particular set of dimensions. While six bolts 40 are shown in the figures, it shall be appreciated that any number of bolts may be used to secure the side plates.

To use the aircraft tow head apparatus, a user adjusts upper side plates 28 and lower side plates 68 to accommodate an aircraft tow pin. The user adjusts locking device 34 so that aircraft tow pin 46 is locked and engaged between cam 36, cam extension tongue 38 and hooks 30 and notches 32 of upper side plates 28. The aircraft is now engaged and ready to be towed to a desired location.

The components of the apparatus described herein are generally made from 4130 alloy steel that is nickel plated to protect the components from all weather conditions. It shall be appreciated that the components of the apparatus described in several embodiments herein may comprise any known materials in the field and be of any color, size and/or dimensions. This allows the system to accommodate any variety of aircraft, towing vehicles, tow bars, or the like. It shall be appreciated that the components of the apparatus described herein may be manufactured and assembled by using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An aircraft tow head apparatus for use with aircraft tow pins of different diameters by incorporating multiple side plates that define a tow pin opening sufficiently large to permit adjustment to accommodate the tow pins of different diameters, the tow head apparatus further comprising a locking device to lock the aircraft tow pin into position, the tow head apparatus comprising:

a pair of side plates each comprising a first side plate and a second side plate that are configured so that when joined together define a space through which a tow pin may be locked into place, the first and second side plates of each pair of side plates having a longitudinal axis and comprising a wall having a thickness sufficiently large to accommodate a plurality of apertures extending through the wall perpendicularly to the longitudinal axis to permit the first and second plate to be mechanically fastened together in one of a plurality of relative positions, where in a first position, the space defined by the first and second plates for the tow pin has a first general nominal diameter and where in a second position, the space defined by the first and second plates for the tow pin has a second general nominal diameter, whereby a user may reposition the first plate relative to the second plate as needed to accommodate tow pins of differing diameters.

2. The aircraft tow head apparatus of claim 1 wherein the first and second plates of each pair of side plates are fastened together by a plurality of bolts and a plurality of nuts.

3. The aircraft tow head apparatus of claim 1, wherein the pair of side plates comprises 4130 alloy steel that is nickel plated.

* * * * *